US012739741B2

(12) United States Patent
Kozhaya et al.

(10) Patent No.: US 12,739,741 B2
(45) Date of Patent: Sep. 15, 2026

(54) METHOD AND SYSTEM FOR EXECUTING INTERNET-OF-THINGS-APPLICATIONS

(71) Applicant: ABB Schweiz AG, Baden (CH)

(72) Inventors: David Kozhaya, Dietikon (CH); Maelle Kabir-Querrec, Aarburg (CH)

(73) Assignee: ABB Schweiz AG, Baden (CH)

( * ) Notice: Subject to any disclaimer, the term of this patent is extended or adjusted under 35 U.S.C. 154(b) by 769 days.

(21) Appl. No.: 17/992,186

(22) Filed: Nov. 22, 2022

(65) Prior Publication Data

US 2023/0164687 A1 May 25, 2023

(30) Foreign Application Priority Data

Nov. 23, 2021 (EP) .................................... 21209911

(51) Int. Cl.
*H04W 48/20* (2009.01)
*H04W 12/00* (2021.01)
(Continued)

(52) U.S. Cl.
CPC ......... *H04W 48/20* (2013.01); *H04W 12/009* (2019.01); *H04W 12/0471* (2021.01); *H04W 88/16* (2013.01)

(58) Field of Classification Search
None
See application file for complete search history.

(56) References Cited

U.S. PATENT DOCUMENTS 10,699,269 B1 * 6/2020 Blankstein ............ H04L 9/0643
10,749,677 B2 * 8/2020 Agrawal ................. H04W 4/70
(Continued)

FOREIGN PATENT DOCUMENTS

CN 112288431 A 1/2021
JP 2013179592 A * 9/2013 ............ H04W 92/02
(Continued)

OTHER PUBLICATIONS

Md Ashraf Uddin et al. "A survey on the adoption of blockchain in IoT: challenges and solutions." (2021). Retrieved online Jul. 23, 2025. https://www.sciencedirect.com/science/article/pii/S2096720921000014 (Year: 2021).*
(Continued)

*Primary Examiner* — James A Reagan
(74) *Attorney, Agent, or Firm* — McCarter & English, LLP; Michael M. Gnibus

(57) ABSTRACT

Described herein is a method for executing an Internet-of-Things application. The method includes providing a machine-readable language configured to encode the Internet-of-Things application as an executable smart contract, and providing or accessing a distributed system configured to execute the executable smart contract. The distributed system includes one or more field devices, one or more gateways, and a distributed ledger system. The distributed ledger system includes at least one access point and a plurality of computers, each computer configured to execute at least one peer process, and executing the executable smart contract on the distributed system. The executable smart contract includes instructions that cause the distributed system to process and exchange data, the exchanged data exchanged between the one or more field devices, or the one or more gateways, or the at least one access point, or at least one peer process, or any combination thereof.

17 Claims, 2 Drawing Sheets

(51) Int. Cl.
*H04W 12/0471* (2021.01)
*H04W 88/16* (2009.01)

(56) References Cited

U.S. PATENT DOCUMENTS

| | | | | |
|---|---|---|---|---|
| 10,833,865 | B2 * | 11/2020 | Kelly | H04L 9/3239 |
| 10,924,363 | B2 * | 2/2021 | Pan | G06Q 20/0658 |
| 10,970,717 | B2 * | 4/2021 | Menon | H04L 9/0643 |
| 10,979,445 | B2 * | 4/2021 | Giura | H04L 63/1433 |
| 10,997,159 | B2 * | 5/2021 | Iwama | H04L 9/0637 |
| 11,128,528 | B2 * | 9/2021 | Nolan | H04W 4/70 |
| 11,232,417 | B2 * | 1/2022 | Klarman | H04L 67/1074 |
| 11,283,865 | B2 * | 3/2022 | Madisetti | H04L 9/50 |
| 11,295,296 | B2 * | 4/2022 | Snow | G06Q 20/367 |
| 11,488,161 | B2 * | 11/2022 | Soundararajan | G06Q 20/06 |
| 11,513,815 | B1 * | 11/2022 | Blankstein | H04L 9/50 |
| 11,520,773 | B2 * | 12/2022 | Iwama | G06F 16/955 |
| 11,531,975 | B2 * | 12/2022 | Verma | G06Q 20/0655 |
| 11,582,042 | B2 * | 2/2023 | Beckmann | H04L 9/3239 |
| 2018/0302222 | A1 * | 10/2018 | Agrawal | H04W 4/70 |
| 2019/0141048 | A1 * | 5/2019 | Fallah | H04L 9/0643 |
| 2019/0349426 | A1 * | 11/2019 | Smith | H04L 9/3239 |
| 2019/0373472 | A1 * | 12/2019 | Smith | H04W 4/38 |
| 2020/0027096 | A1 * | 1/2020 | Cooner | G06Q 40/04 |
| 2021/0263909 | A1 * | 8/2021 | Paracha | G06Q 10/0639 |
| 2023/0177489 | A1 * | 6/2023 | Chan | G06Q 20/3672 705/66 |

FOREIGN PATENT DOCUMENTS

| | | | | |
|---|---|---|---|---|
| WO | WO-2007145687 | A1 * | 12/2007 | G07C 9/27 |
| WO | WO-2010054843 | A1 * | 5/2010 | H04L 63/0892 |

OTHER PUBLICATIONS

Simon Soele Madsen et al. "A QR code based framework for auto-configuration of IoT sensor networks in buildings." (Sep. 24, 2021). Retrieved online Jul. 23, 2025. https://energyinformatics.springeropen.com/articles/10.1186/s42162-021-00152-w (Year: 2021).*

Hong-Ning Dai et al. "Blockchain for Internet of Things: A Survey." (Jun. 2019). Retrieved online Jul. 23, 2025. https://www.researchgate.net/publication/333600905_Blockchain_for_Internet_of_Things_A_Survey (Year: 2019).*

Loukil et al., "Semantic IoT Gateway: Towards Automated Generation of Privacy-Preserving Smart Contracts in the Internet of Things" Oct. 18, 2018, Advances in Biometrics : International Conference, ICB 2007, Seoul, Korea, Aug. 27-29, 2007; Proceedings, Springer, Berlin, Heidelberg, pp. 207-225, XP047491 551, ISBN : 978-3-540-74549-5.

Extended European Search Report for European Application No. 21209911.3, dated Apr. 25, 2022, 13 pages.

* cited by examiner

METHOD AND SYSTEM FOR EXECUTING INTERNET-OF-THINGS-APPLICATIONS

CROSS-REFERENCE TO RELATED APPLICATION

This application claims priority to European Patent Application No. 21209911.3, filed Nov. 23, 2021, and titled "METHOD AND SYSTEM FOR EXECUTING INTERNET-OF-THINGS-APPLICATIONS", which is hereby incorporated by reference in its entirety.

BACKGROUND

Method and systems for executing Internet-of-Things applications.

An Internet-of-Things application receives data from one or more field devices, for example data produced by field devices such as sensors and/or actuators.

The data of the field devices is communicated over a communication network.

It is often necessary to store and/or to process the data of the field devices.

In particular, if a plurality of field devices communicates data, said data may be advantageously communicated via one or more gateways to a data processing system configured to store and process said data and to transmit stored and processed data to a data consumer.

Conversely the data processing system may receive requests from the data consumer and acquire data from the field devices according to the request.

More generally, the consumer needs to implement an Internet-of-Things application that defines how data is communicated from and to the field devices and how the data may be processed and/or stored by the data processing system. The Internet-of-Things application defines therefore how data is communicated between the data consumer, the data processing system, the gateways and the field devices and how the data is stored, retrieved and processed.

There is a need to provide end-to-end security when executing the Internet-of-Things application and to fully automate said execution.

BRIEF DESCRIPTION

The disclosure is defined by the independent claims. The dependent claims define further embodiments of the disclosure.

DETAILED DESCRIPTION

Figure 1:
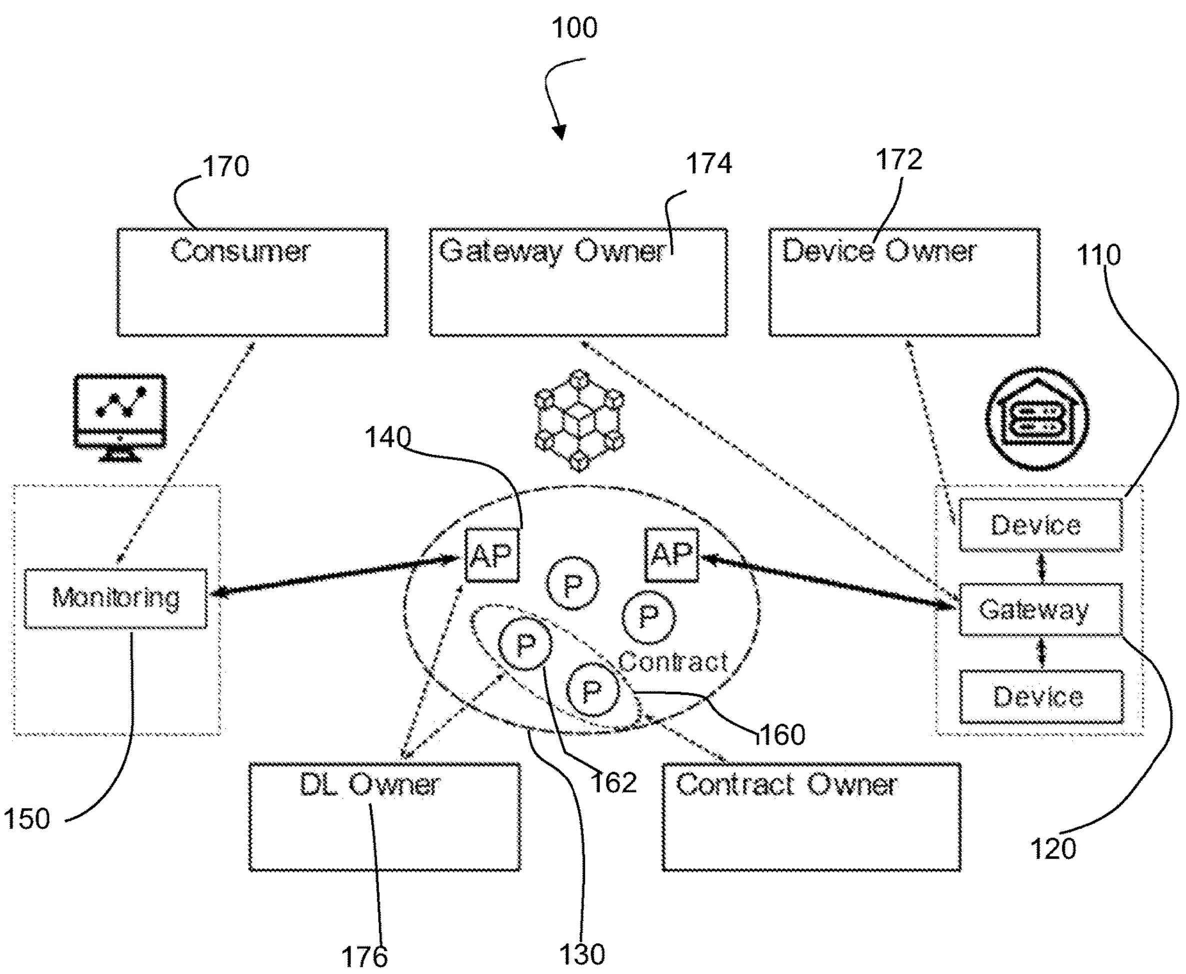
FIG. 1 shows a system for executing Internet-of-Things applications according to embodiments of the present disclosure.

Internet-of-Things (IoT) applications involve one or more field devices, including sensors and/or actuators that provide device data. Device data may be communicated from and to at least one data consumer via a distributed system that stores and/or processes the device data.

The present disclosure proposes novel systems and methods for executing Internet-of-Things applications. The present disclosure enables the development and deployment of end-to-end secure distributed IoT applications from the field devices all the way to the end user.

Typically, customers may entrust at least one service provider with processing their data or for facilitating secure transactions among them. Trust is a key element of IoT applications involving several parties especially when sensitive data is involved and when those parties, as part of a service, wish to interact in a peer-to-peer fashion.

The proper treatment of the data by the service provider is guaranteed by legal contracts. To verify that the processing does not deviate from the contractually agreed-upon operations, customers can audit the service provider, which involves human efforts and is costly. Ensuring proper treatment of the data, not to mention its integrity, confidentiality, and accessibility rights, becomes even more challenging in decentralized settings where multiple parties host the data and third-party trust is not always possible.

The present disclosure introduces transparency into applications and services realized based on IoT data as per the data processing agreements, as well as data validation: these concepts are not only legally formalized in smart contracts but also implemented into secure programs that execute them. All involved parties may have access to these programs encoded as smart contracts. For example, no access or change can be made unilaterally to the smart contract without other participants agreeing to it and/or operations run by the framework may be recorded for all parties to see.

Switching from a centralized model almost exclusively managed by the service provider to a secure and transparent peer-to-peer distributed system introduces trust into IoT applications. This trust gives customers an incentive to subscribe to IoT services as the system is more trustworthy and secure. The application is also much easier to engineer as any change can programmatically be endorsed by all the involved parties and automatically deployed, which is time- and cost-effective and makes such IoT applications more flexible and easier to update.

When executing IoT applications with known systems and methods, a set of PROBLEMS occurs. The present disclosure overcomes these problems.

In typical IoT applications, usually there is a central entity, usually a service provider, that manages the whole infrastructure to ensure the coordinated execution of operations. Customers subscribe to the offered services and play a rather passive role. They must trust the service provider on various levels including:

1. IoT data integrity: IoT data used by the provided service is authentic and is the actual data produced by the IoT field devices.
2. IoT data confidentiality: IoT data agreed upon privacy is not breached.
3. Application security and adherence to agreed/claimed specifications: application code is adherent to the service specifications and is not manipulated unless by agreed upon updates.
4. Application data security and traceability: data generated by the service is traceable and secure.

Also, if the service provider itself is a party in the service, it becomes more challenging to guarantee the fairness of the service being provided. If customers need additional assurance, they can audit the application implemented by the service provider, which is time-consuming and expensive. Once the customers have granted the service provider access to their data, they lose track of it and only receive the results that are delivered at the end of the processing. The development and deployment of most of the application is typically also taken care of by the service provider as they are in control of the underlying infrastructure. So, customers have little awareness of the application architecture and implementation. This limited involvement of the customers into the processing of their data can make them renounce such offerings. The present disclosure provides methods and systems for executing Internet-of-Things applications that provide end-to-end security and automate the execution of the applications on a distributed system providing trustworthiness.

Another problem that the present disclosure addresses is the lack of adaptability of IoT applications once deployed. Any change needs to be negotiated and agreed upon by all parties, and the contract needs to be modified or amended accordingly. The more parties involved, the greater the work. This again is time- and effort-consuming which proves to be an impediment to answering to evolving customer or market needs. Addressing this point makes it easier to apply changes to IoT applications in accordance with all involved parties, even if they are many.

The present disclosure addresses in particular the described problems by providing SOLUTIONS as described in the present disclosure.

The present disclosure provides systems and methods for executing an IoT application. In particular, the present disclosure implements building multi-party automated and secure IoT applications that may allow the involved organizations to actively participate through consensus on any change to be applied. The present disclosure implements a transparent operation and execution of the application, that may be validated and immutably recorded for all to see.

The present disclosure implements trustworthy execution of IoT applications and easiness in adapting and maintaining the applications.

Parties need to agree on the privileges each of them will have in the framework before it is deployed. Once in operation, they can modify it jointly if needed.

A fleet of one or more field devices that may belong to at least one organization or individual and producing device data to be fed to the application is connected to one or more gateways.

Field devices include sensors and/or actuators, thereby the device data may be sensor data and/or actuator data.

The data stored, processed and communicated by systems and methods of the present disclosure thereby include sensor data and/or actuator data and may be further processed/stored/transferred based on instructions encoded in a smart contract.

The data may be used, for example, to control physical devices and/or, for example, for monitoring physical devices that may be the field devices and/or further devices, for example, physical devices of a consumer.

The one or more gateways are responsible for gathering field device data and transferring it to a distributed ledger system that implements and runs the application.

In the present disclosure, a distributed ledger system may not only store data, but if required actively process and modify said data based on an executable smart contract encoding an IoT application.

A smart contract is executable on a distributed computing system and may automatically execute and/or document relevant events and performed actions. For example, the execution may be documented in the distributed ledger forming a consensus among a plurality of owners about synchronized data describing the execution of the smart contract. The distributed ledger system may include a peer-to-peer network of peer processes running on a plurality of computers controlled by different distributed ledger owners. The peer processes may reach a consensus about the execution of the smart contract and/or may register the execution of the smart contract in records recorded by the peer processes running within the distributed ledger. When a plurality of peer processes run on computers owned by a plurality of owners, said plurality of peers reaching a consensus and/or registering operations of the execution of the application of the consumer, a distributed system is obtained that provides a trustworthy execution of the application, relying on a low probability that a majority of owners are malicious.

The distributed ledger may be at least in part implemented by and/or include a blockchain and/or use consensus algorithms among the peers.

The gateway connects to the framework through at least one access point. From the at least one access point the data is sent to the nodes of the distributed system for processing. The nodes may be peer processes, called peers, running on a plurality of computers within the distributed ledger system. The peer processes running on the plurality of computers of the distributed ledger system thereby execute programs in accordance with the executable smart contract encoding the IoT application.

The programs that are implemented on the nodes of the distributed system can be invoked by the participants of the framework. When a participant enrolls into the framework, a policy may be defined in agreement with all the other participating organizations that specifies the participant's privileges, and hence the programs that it can invoke. These programs may be executed only after enough nodes have agreed to it.

The operation may be recorded in a distributed ledger that is consistent to all nodes so that all participants can ensure the proper execution of operations. This is how transparency can be achieved, as well as automating the application and its management.

Regarding the end-to-end security, the organizations participating in the framework establish trust among them by leveraging a classical public key infrastructure (PKI) with a common certification authority (CA) that they all trust. Once this first level of security has been established, each organization is responsible for sharing the public keys of the components they own with other organizations, for authentication, integrity, and confidentiality purposes. Data transferred between the at least one field device and/or gateway and/or peer processes of the owners or stored in data bases is signed by the source generating it and is encrypted to consumption. The only parties that can decrypt data X are those that have the right to consume data X.

Unlike classical PKIs, the private cryptographic material, namely that of applications, is not in the form of private keys but rather in the form of private key shares distributed over all the nodes/peers running the application. This ensures that no single instance/owner, for example due to a node of some party begin malicious, can unilaterally access or manipulate data.

By coupling field devices producing data with a distributed ledger system based on an agreement protocol and using cryptographic means to secure data in transit and at rest, the disclosed framework make IoT applications more trustworthy to all stakeholders, secure and easy to modify.

FIG. 1 illustrates a system 100 for executing IoT (Internet-of-Things) applications according to embodiments of the present disclosure.

The system 100 for executing IoT applications relies mainly on a distributed ledger system 130 based on an agreement protocol.

In FIG. 1, the distributed ledger system 130 is delimited by the dotted oval shape. At least one access point 140, AP, represents an interface with the distributed ledger system 130. Access points AP of the distributed ledger system form the only interfaces of the distributed ledger system 130. On the field side, at least one gateway 120 connects to access points AP to feed the distributed ledger system with data gathered from at least one field device 110.

On the consumer side, a monitoring application 150 connects to the at least one access point 140 to request data from the distributed ledger system 130.

The nodes constitutive of the distributed ledger system form peers marked, for example, with a P in FIG. 1. A peer is a peer process runs on a computer controlled by an owner and configured to operate according to a smart contract.

The distributed ledger system includes a plurality of computers and/or a distributed computing system that is configured to run a plurality of peer processes. A computer is, for example, computer 160. The computers are configured to execute at least one peer process 162 called peer and indicated with P.

A plurality of computers may be co-located and/or be formed by a single computing unit and/or may be formed by separate physical machines as long as a respective owner controls a respective computer.

The peer process 162 forms, for example, one peer marked with P in FIG. 1.

The peer processes P execute the programs, called contracts, that implement the IoT application, and maintain the actual ledger data thereby executing an executable smart contract encoding the IoT application.

There are five roles required to operate this framework. The roles are further illustrated in FIG. 1. Participating organizations may endorse one or many of these roles. Here is a description of these roles:

- Consumer 170: The consumer 170 may consume a service provided by the system 100. The consumer 170 can be a customer that interacts with the system 100 by requesting data from the distributed ledger system 130. To this end, it uses the monitoring functionality to access distributed ledger data stored and/or processed in the distributed ledger system 130.
- Device Owner 172: A device owner 172 may be responsible for a certain set of field devices 110. It is the responsibility of the device owner to equip the field device 110 with credentials that enable it to interact with the other system components.
- Gateway Owner 174: A gateway owner 174 may manage the gateway 120 to which a set of field devices 110 is connected. The roles of device owner 172 and owner 174 of the corresponding gateway 120 may be taken on by the same real-world entity.
- Distributed ledger Owner 176: A distributed ledger (DL) owner 176 manages parts of the distributed ledger (DL) system 130 infrastructure, in particular access points (AP) 140 and peers P among the peer process(es) running on a computer 160 in the distributed ledger system. The DL owner 176 is responsible to ensure the correct functioning of components of the distributed ledger system 130, in particular of at least one access point and/or at least a computer of the distributed ledger system. One distributed ledger system 130 may be composed of components owned by many DL owners.
- Contract Owner: A smart contract describes an application running on the distributed ledger. The contract owner has to make sure that the desired number of peer processes 162, P, execute it. Moreover, it has to ensure that the correct devices can provide data to the peers P running the smart contract and that consumers 170 can access the created data in the distributed ledger 130.

When the framework is first commissioned, policies may be defined to specify the privileges of each participating organization corresponding to the roles it endorses. E.g., such policies may specify the contracts that an organization can invoke, the data that it can access, the list of organizations that need to approve the integration of new organizations, etc.

Along with the roles that an organization can take, we need to describe the components that compose the system. They are presented in more detail in the following:

- Field device 110: A field device 110 is a physical device with limited resources that is intended to provide data to distributed ledger applications, e.g., sensors, smart meters, etc.
- Gateway 120: A gateway 120 is a device that includes more computing, memory, and communication resources compared to the field devices producing data. A gateway is an intermediary proxy between the physical devices generating data and the distributed ledger system 130. It typically gathers and potentially aggregates data from (a subset of) physical devices connected to it, or computes new data, to later relay that data to the peer processes 162, P, executing the targeted smart contract.
- Access Point 140: An access point 140 constitutes the interface between the distributed ledger and the outside world. It is a process on a machine that may be co-located with machines and/or processes that constitute other access points or that run peer processes 162, P. Its main function is to relay messages from peers P in the distributed ledger system 130 to the external gateways or the monitoring applications 150, which consumers 170 can interact with, and vice versa. This communication is always carried out over a secure communication channel.
- Peer: Peers P are peer processes 162 implementing the components of the distributed ledger. A peer P is a process running on a physical machine/computer 160, potentially co-located with other peers P or access point AP processes. However, peers P should be placed on several different physical machines/computers 160, operated by different DL owners 176 in order to get the benefits of distributed ledgers, namely security, minimized connectivity bottlenecks, etc.
- Contract: A smart contract encodes a distributed ledger application. Thus, it is a piece of code that is executed by a specific set of peers P. A smart contract encapsulates the executable logic for generating, executing, and controlling events and actions that are stored in the distributed ledger (DL) system. Part of the smart contract functionality serves to validate transactions that are stored on the distributed ledger. Hence, as part of this validation, a contract must be able to validate the authenticity and integrity of data received from gateways.

Operation to be run by the system, including but not limited to management of the system itself or its components, data ingestion, data processing, etc., is provided by a smart contract and is deployed after agreement among participants has been reached as specified in policies.

Operations may include in particular: ingestion of the data into the distributed system and storage, applications, data authentication, and/or data encryption.

Ingestion of the data into the distributed system and storage, applications, data authentication, and/or data encryption are described in detail in the following.

The ingestion of data from the field devices into the DL is run so as to ensure the integrity and confidentiality of the data. Upon deployment of a new component, field device or gateway, its owner can provide its public key to a front-end application for enrolling it into the system. This application creates and deploys a smart contract that governs the collection and storage of the data from the field component, namely an ingestion contract. The public key of the field component is used to set up a secure communication channel with the DL. Hence the data is transferred encrypted and signed, and it is stored in dedicated data base(s) of the distributed ledger system.

Along with the data is stored the encryption key that was used for encrypting it at its source. This key is itself encrypted with the public key of any consumer that is allowed to access it. There are as many encrypted versions of the encryption key stored as there are entities supposed to access it.

Applications are a peculiar type of operations. They are what the consumers are interested in and may want to run or subscribe to. For running applications and therefore accessing specific data a consumer requests it from a monitoring application that invokes the corresponding smart contract. This contract checks that the consumer is legitimate, retrieves the required data and the adequate encryption/decryption key from the data base/distributed ledger system, and returns it to the monitoring application. The contract may return the data as stored in the database/distributed ledger system or it may return a processed version of it. In both cases the data sent by the contract to the monitoring application for the consumer to read is encrypted with the consumer key.

In order to ensure that the field devices send data to the correct recipients and that correct data is stored in the DL, mutual authentication is required. Since each field device or gateway is equipped with a public-private key pair, authenticating signed messages from a device or gateway is straightforward for any component that holds the corresponding public key. Since devices connected to a gateway hold the gateway's public key, they can verify the authenticity of requests coming from the gateway. Likewise, the gateways can verify the authenticity of device data. As far as data ingested into the DL is concerned, there are two options. If the gateway manipulates the device data in any way, for example by aggregating parts of it, it adds its own signature to the computed data before sending it to the access point. If device data is sent directly, the gateway can send this data with the device's signature. This approach ensures that any piece of data always carries the signature of the data producer. The access points possess the public keys of the gateways, and vice versa, in order to establish a mutually authenticated connection. As the access points do not process the data themselves, they do not verify appended signatures, regardless of whether devices or gateways signed the data.

Each peer process P must hold the public keys of all devices and gateways that provide data to any contract that this peer executes. As the peer P constitutes the communication end point, it must verify the signature for each received piece of data. While most data flows from the devices to the distributed ledger, providing the necessary input for the execution of one or more smart contracts, peers running a particular contract must also send some messages to the field devices. Specifically, the smart contract may require data at a specific granularity and periodicity, which must be communicated to the gateways. The gateways must be able to verify the authenticity of any data request. To this end, a gateway holds the public key of all contracts for which it provides data from the attached devices. Technically, authentication in this direction is more involved because the peers running a contract do not have access to the contract's private key which is held by the contract owner.

The contract owner distributes private key shares when deploying the contract. Thus, whenever the peer processes need to send a message to a device, the peer processes carry out the following:

1. The peer processes reach agreement on the message to be sent.
2. Given this message, each peer process locally computes its signature share based on the message and its private key share.
3. The signature shares are assembled, and the signed message is sent.

In the following, each of the steps is discussed in greater detail. The first step requires the execution of a consensus protocol to ensure that all peer processes P that are functioning correctly agree on the same message. DLs typically come equipped with such consensus protocols, which guarantee that agreement is reached even if some (faulty) peers deviate from the protocol. The second step is a local computation, and the details of this computation depend on the used signature scheme. The final step requires the collection of signature shares: The peers send the signature shares to some (potentially all) peers, which assemble the signature as soon as enough signature shares have been obtained. These peers then send the message plus the assembled signature to an access point. The access point ideally sends the signed message only once, which necessitates the use of a small cache to identify duplicates. A single peer is typically not tasked to deliver the message to the access point because no single peer is trusted to function correctly, a fundamental assumption for any distributed system.

Since there may be malfunctioning (or even malicious) peers, a subset of peers must be able to sign a message. On the other hand, it should not be possible for a small set of peers to create valid signatures. Formally, if there are n peers running a contract, a signature can be assembled from any $m \leq n$ signature shares, where m is a fixed constant. The parameter m must be chosen so that the probability that more than $\min\{m-1; n-m\}$ peers are faulty is negligible, in which case it is extremely improbable for faulty nodes to sign a (potentially corrupt) message while signing messages for correct nodes remains possible. There are several m-out-of-n signature schemes, so-called threshold signature schemes, that require m out of n signature shares to compute a valid signature. Threshold signature schemes make it possible to implement the signing mechanism outlined above.

An additional requirement is the encryption of all device data. For the sake of efficiency, a symmetric encryption scheme should be used to encrypt data. Thus, assuming that the components agree on the use of a specific symmetric encryption scheme, the question is how components that need to interact can agree on a shared symmetric key in a secure manner. End-to-end security is required, which means that the data must be encrypted along the whole path from the initial sender to the final consumer. As mentioned before, most data flows towards the distributed ledger system. The first step is to encrypt the data on the filed device before forwarding it to the gateway. This process works as follows:

1. The field device generates the symmetric key to be used.
2. The field device encrypts the symmetric key using the gateway's public key and sends it to the gateway.
3. Upon receiving the encrypted key, the gateway decrypts the key using its private key and uses the decrypted symmetric key for decrypting subsequent device messages.

Regarding the communication with the distributed ledger platform, end-to-end security is attained when the data coming from the gateway is decrypted by the peers that run the contract processing this data. For a specific contract that requires certain input data, the gateway encrypts the symmetric key that is used to encrypt this data with the contract's public key and sends the encrypted symmetric key to the access point, which in turn forwards it to the peers. The peers can then decrypt the symmetric key using the same mechanism as when signing a message in a distributed manner: each peer involved in the contract generates a "symmetric key share" by processing the encrypted key with its private key share. The key shares are then combined into the correct symmetric key among the peers. The complexity is not problematic as the symmetric key may remain valid and thus can be used for a long period of time.

In the present disclosure, data transmitted to an entity and encrypted with a public key of the entity is subsequently decrypted by the entity with the corresponding private key of said entity.

Data encrypted with a symmetric key is subsequently decrypted with the same symmetric key.

The symmetric key may be shared among entities in encrypted form, based on asymmetric cryptography (public-key cryptography).

The entity encrypting and/or decrypting the data may be a field device, a gateway, the distributed ledger system, and/or the consumer.

The distributed ledger system uses a private key of the smart contract for decryption and employs a threshold cryptosystem based on said private key of the smart contract, wherein the peer processes and the distributed ledger owners do not know the private key of the smart contract (forming the private key of the distributed ledger system) but only private key shares.

Similarly, the distributed ledger system signs data based on the private key shares of a private key of the smart contract forming the private key of the distributed ledger. The peers and the distributed ledger owners do not know the private key of the smart contract. The digital signature can then be verified based on the public key of the smart contract.

Figure 2:
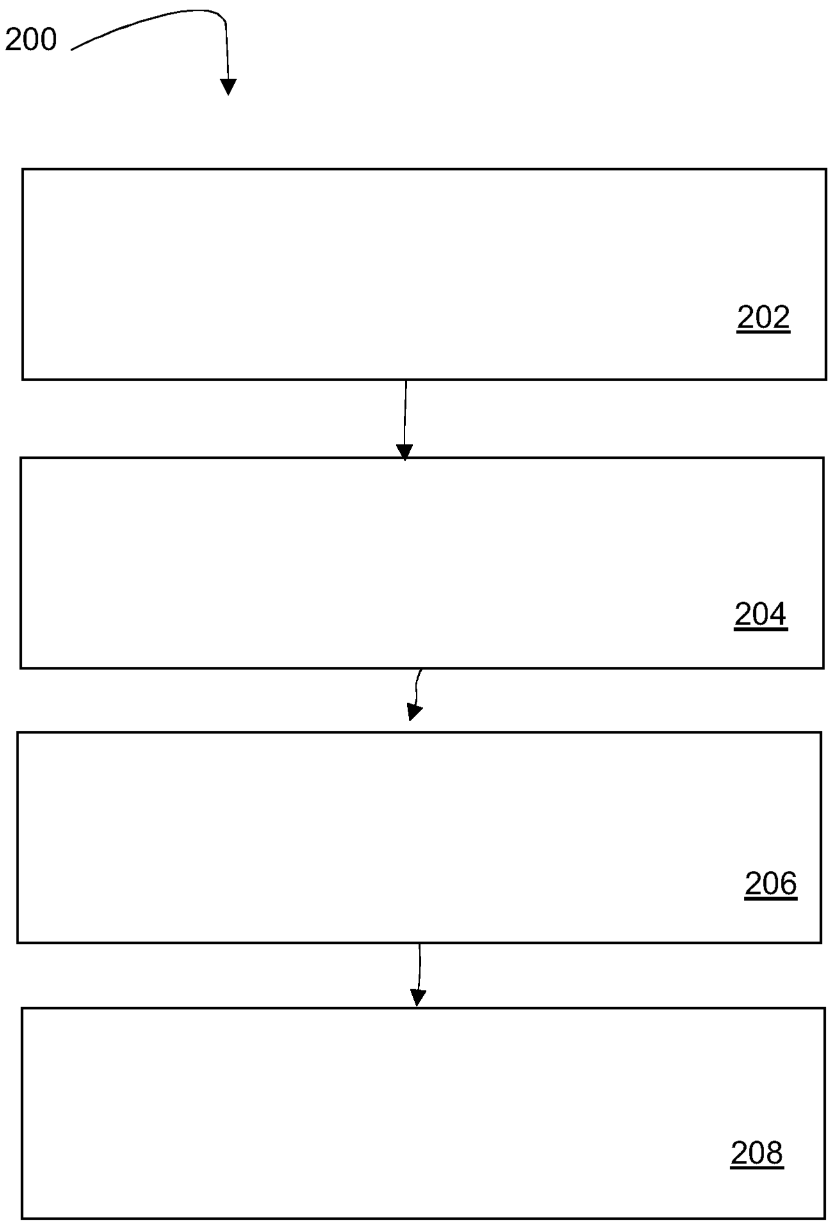
FIG. 2 shows a method for executing Internet-of-Things applications according to embodiments of the present disclosure.

FIG. 2 shows a method 200 for executing Internet-of-Things applications according to embodiments of the present disclosure.

The method 200 for executing an Internet-of-Things application includes:

providing 202 a machine-readable language configured to encode the application as an executable smart contract, receiving 204 a code encoding the Internet-of-Things application in the machine-readable language, the code forming an executable smart contract of the application, providing or accessing 206 a distributed system configured to execute the executable smart contract, the distributed system including one or more field devices, one or more gateways and a distributed ledger system, the distributed ledger system including at least one access point and a plurality of computers, each computer of the plurality of computers configured to execute at least one peer process;

executing 208 the executable smart contract on the distributed system;

and the executable smart contract includes instructions that cause the distributed system to process and exchange data, the exchanged data being exchanged between the one or more field devices and/or the one or more gateways and/or the at least one access point and/or at least one peer process.

In some embodiments the method further includes:

providing a plurality of distributed ledger owners, each distributed ledger owner owning and controlling at least one computer of the plurality of computers;

configuring the machine-readable language configured to encode the application as an executable smart contract to include instruction that when executed cause a data exchange between peer processes of computers of the plurality of computers owned and controlled by different distributed ledger owners;

configuring the distributed system to implement the data exchange according to the instructions when the smart contract is executed;

encrypting and/or signing exchanged data when the smart contract is executed;

and the field devices include sensors and/or actuators configured to exchange data according to an Internet-of-Things protocol.

In some embodiments, encrypting and/or signing the exchanged data is based at least in part on a threshold cryptosystem where private key shares, relative to the executable smart contract, are disseminated among the peer processes within the distributed ledger.

In some embodiments:

the one or more field devices are configured to provide device data based on the executable smart contract, in particular device data including sensor data, the one or more gateways are configured to perform one or more of the following operations based on the executable smart contract: gather device data, aggregate device data, compute new data, the one or more gateways are configured to provide gateway data based on the executable smart contract and further based on gathered and/or aggregated device data and/or based on computed new data, the distributed ledger system is configured to request and to receive device data and/or gateway data based on the executable smart contract, and the distributed ledger system is configured to process and/or store and/or transfer and/or provide the received gateway data based on the executable smart contract.

In some embodiments:

the at least one access point is configured to form an interface of the distributed ledger system for communicating with the one or more gateways and for communicating with at least one consumer via a monitoring application and the at least one access point is further configured to provide input access point data to the distributed ledger system based on gateway data and/or based on consumer requests via the monitoring application and based on the executable smart contract;

the at least one peer process is configured to process input access point data and to provide peer processed data based on the executable smart contract;

the at least one access point is further configured to provide output access point data from the distributed ledger system based on the peer processed data and to output the output access point data to the consumer via the monitoring application based on the executable smart contract.

In some embodiments:

the exchanged data is device data and/or gateway data and/or input access point data and/or peer processed data and/or output access point data and the data is exchanged based on the executable smart contract during the execution of the executable smart contract, encrypting the exchanged data further includes encrypting the device data and/or encrypting the gateway data and/or encrypting the peer processed data and/or encrypting the output access point data, the encryption being based on the executable smart contract during the execution of the executable smart contract; encrypting the exchanged data being based on a public key infrastructure and threshold cryptography.

In some embodiments, output access point data is signed based on an assembling of a plurality of signature shares of the peer processes, each signature share being computed by a respective peer process based on data processed by the peer process and/or by the distributed ledger system and based on a private key share of the peer process obtained using a threshold signature scheme based on a private key of the smart contract not communicated to the peer processes.

In some embodiments, the peer processes send data being signed by carrying out the following operations:

reaching an agreement on the data to be sent;

each peer process locally computing a signature share based on the data and a private key share of the peer process;

assembling the signature shares and sending the data with the assembled signature via the at least one access point to at least one field device and/or to at least one gateway and/or to the consumer via the monitoring application.

In some embodiments:

the device data and/or the gateway data is data encrypted based on a symmetric encryption scheme, the symmetric key being shared in encrypted form based on an encryption with a public key of the smart contract; and the decryption of the encrypted data is based on a decryption based on the symmetric key.

In some embodiments:

gateway data and/or device data is encrypted based on a symmetric encryption scheme, the symmetric key being shared in encrypted form between the gateway and/or the device and the peer processes of the distributed ledger system;

the symmetric key is encrypted by a public key of the smart contract forming a public key of the distributed ledger system and is decrypted by each peer process of the distributed ledger system computing a symmetric key share based on a private key share of the private key of the smart contract corresponding to the public key of the smart contract and then combining the symmetric key shares, and the private key of the smart contract/distributed ledger is not communicated to the peer processes.

In some embodiments, device data provided by at least one field device is encrypted carrying out the operations:

generating a symmetric key by the device providing the data;

encrypting the symmetric key using the public key of a gateway in the one or more gateways;

upon receiving the encrypted symmetric key, decrypting the encrypted symmetric key using the private key corresponding to the public key of the gateway; and using the decrypted symmetric key for decrypting data sent between the device and the gateway.

In some embodiments, the distributed ledger system stores data sent to a data receiver selected from the one or more gateways and the one or more field devices and the consumer, together with the symmetric key used for the encryption of the data stored itself in encrypted form in the distributed ledger system, the symmetric key encrypted with the public key of the data receiver.

In some embodiments, the plurality of computers is partitioned into blocks owned by different distributed ledger owners and the peer processes are distributed on the plurality of computers to maximize the number of different distributed ledger owners owning computers executing the peer processes.

The present disclosure further provides a system for executing distributed Internet-of-Things applications, the system including:

one or more field devices configured to provide device data including sensor data;

one or more gateways, the one or more gateways being configured to perform one or more of the following operations: gather and/or aggregate device data from at least one of the one or more field devices, compute new data based on gathered and/or aggregated device data; the one or more gateways being further configured to provide gateway data based on the gathered and/or aggregated device data and/or based on the computed new data;

a distributed ledger system, the distributed ledger system being configured to request and to receive device data and/or gateway data; the distributed ledger system being further configured to process and/or store and/or transfer and/or provide the received gateway data, the distributed ledger system including:

at least one access point configured to form an interface of the distributed ledger system for communicating with the one or more gateways and for communicating with at least one consumer via a monitoring application, the at least one access point further configured to provide input access point data to the distributed ledger system based on gateway data and/or based on consumer requests via the monitoring application, a plurality of computers, each computer of the plurality of computers configured to execute at least one peer process configured to process input access point data and to provide peer processed data;

and the access points are further configured to provide output access point data from the distributed ledger system based on the peer processed data and to output the output access point data to the consumer via the monitoring application;

and the one or more field devices, the one or more gateways, the at least one access point of the distributed ledger system and the plurality of computers of the distributed ledger executing the peer processes are programmable with a smart contract encoding an application for the system, the smart contract encoding a distributed Internet-of-Things application defining how data should be processed and/or stored and/or accessed in and between the one or more field devices, the one or more gateways and the distributed ledger system.

In some embodiments, the device data and/or the gateway data and/or the input access point data and/or the peer processed data and/or the output access point data is signed and encrypted;

and/or the system is configured to store and/or access and/or transfer data in the distributed ledger system in a signed and encrypted form;

and the encrypted data is based at least in part on a threshold cryptosystem sharing a private key among the peer processes within the distributed ledger.

In some embodiments, the monitoring application is configured to handle one or more smart contracts and to allow a consumer to request and/or build a distributed Internet-of-Things application based on a machine-readable language configured to encode Internet-of-Things applications, the application being encoded in the machine-readable language, the code forming an executable smart contract configured to program the one or more field devices, the one or more gateways, the at least one access point and the plurality of computers.

The invention claimed is:

1. A method for executing an Internet-of-Things application, the method comprising:

providing a machine-readable language configured to encode the Internet-of-Things application as an executable smart contract;

receiving a code encoding the Internet-of-Things application in the machine-readable language, the code forming the executable smart contract of the Internet-of-Things application;

providing or accessing a distributed system configured to execute the executable smart contract, the distributed system comprising one or more field devices, one or more gateways and a distributed ledger system, the distributed ledger system comprising at least one access point and a plurality of computers, each computer of the plurality of computers configured to execute at least one peer process; and executing the executable smart contract on the distributed system;

wherein the executable smart contract includes instructions that cause the distributed system to process and exchange data, the exchanged data exchanged between the one or more field devices, or the one or more gateways, or the at least one access point, or the at least one peer process, or any combination thereof; the method further comprising:

providing a plurality of distributed ledger owners, each distributed ledger owner owning and controlling at least one computer of the plurality of computers;

configuring the machine-readable language configured to encode the Internet-of-Things application as the executable smart contract including executable instructions that cause a data exchange between peer processes of computers of the plurality of computers owned and controlled by different distributed ledger owners;

configuring the distributed system to implement the data exchange according to the instructions in response to the executing of the executable smart contract on the distributed system; and encrypting, or signing, or encrypting and signing the exchanged data in response to the executing of the executable smart contract on the distributed system;

wherein the one or more field devices include sensors, or actuators, or sensors and actuators configured to exchange data according to an Internet-of-Things protocol; and wherein encrypting, or signing, or encrypting and signing the exchanged data is based at least in part on a threshold cryptosystem configured to disseminate private key shares, relative to the executable smart contract, among the peer processes within the distributed ledger system.

2. The method of claim 1, wherein:

the one or more field devices are configured to provide device data based on the executable smart contract, the one or more gateways are configured to perform one or more of the following based on the executable smart contract: gather the device data, aggregate the device data, and/or compute new data, the one or more gateways are configured to provide gateway data based on the executable smart contract and further based on the gathered or the aggregated device data, or based on the computed new data, or on any combination thereof, the distributed ledger system is configured to request and to receive the device data, or the gateway data, or any combination thereof based on the executable smart contract, and the distributed ledger system is configured to process, or store, or transfer, or provide the received gateway data, or implement any combination thereof based on the executable smart contract.

3. The method of claim 2, wherein the at least one access point is configured to form an interface of the distributed ledger system for communicating with the one or more gateways and for communicating with at least one consumer via a monitoring application and wherein the at least one access point is further configured to provide input access point data to the distributed ledger system based on the gateway data, or based on consumer requests via the monitoring application, or any combination thereof and based on the executable smart contract, wherein the at least one peer process is configured to process input access point data and to provide peer processed data based on the executable smart contract, and wherein the at least one access point is further configured to provide output access point data from the distributed ledger system based on the peer processed data and to output the output access point data to the consumer via the monitoring application based on the executable smart contract.

4. The method of claim 3, wherein:

the exchanged data is the device data, or the gateway data, or the input access point data, or the peer processed data, or the output access point data, or any combination thereof and the exchanged data is exchanged based on the executable smart contract during the execution of the executable smart contract, and encrypting the exchanged data further comprises encrypting the device data, or encrypting the gateway data, or encrypting the peer processed data, or encrypting the output access point data, or any combination thereof, the encryption based on the executable smart contract during the execution of the executable smart contract, and encrypting the exchanged data based on a public key infrastructure and threshold cryptography.

5. The method of claim 4, wherein the peer processes send the data being signed by:

reaching an agreement on the data to be sent;

each peer process locally computing a signature share based on the data and a private key share of the peer process; and assembling the signature shares and sending the data with an assembled signature via the at least one access point to at least one field device of the one or more field devices, or to at least one gateway of the one or more gateways, or to the consumer, or to any combination thereof via the monitoring application.

6. The method of claim 5, wherein the device data, or the gateway data, or any combination thereof is data or is encrypted based on a symmetric encryption scheme, a symmetric encryption key of the symmetric encryption scheme shared in encrypted form based on an encryption with a public key of the executable smart contract, wherein decryption of the encrypted data is based on the symmetric encryption key, and wherein the gateway data, or the device data, or any combination thereof is encrypted based on the symmetric encryption scheme, the symmetric encryption key shared in encrypted form between the at least one gateway of the one or more gateways, or the at least one field device of the one or more field devices, or any combination thereof and the peer processes of the distributed ledger system, wherein the symmetric encryption key is encrypted by the public key of the executable smart contract forming a public key of the distributed ledger system and is decrypted by each peer process of the distributed ledger system computing a symmetric key share based on a private key share of the private key of the executable smart contract corresponding to the public key of the executable smart contract and then combining the symmetric key shares, and wherein the private key of the executable smart contract is not communicated to the peer processes.

7. The method of claim 4, wherein:

the device data, or the gateway data, or any combination thereof is data encrypted based on a symmetric encryption scheme, a symmetric encryption key of the symmetric encryption scheme shared in encrypted form based on an encryption with a public key of the executable smart contract, and wherein decryption of the encrypted data is based on the symmetric encryption key.

8. The method of claim 7, wherein device data provided by at least one field device of the one or more field devices is encrypted by:

generating a symmetric key by the at least one field device of the one or more field devices providing the data;

encrypting the symmetric key generated by the at least one field device of the one or more field devices using a public key of a gateway of the one or more gateways;

upon receiving the encrypted symmetric key, decrypting the encrypted symmetric key using a private key corresponding to the public key of the gateway; and using the decrypted symmetric key for decrypting data sent between the at least one field device of the one or more field devices and the gateway in the one or more gateways.

9. The method of claim 7, wherein the distributed ledger system stores data sent to a data receiver selected from the one or more gateways and the one or more field devices and the consumer, together with the symmetric encryption key used for encryption of the data stored in encrypted form in the distributed ledger system, the symmetric encryption key encrypted with a public key of the data receiver.

10. The method of claim 3, wherein the output access point data is signed based on an assembling of a plurality of signature shares of the peer processes, each signature share computed by a respective peer process of the peer processes based on data processed by the peer process, or by the distributed ledger system, or by any combination thereof and based on a private key share of the peer process obtained using a threshold signature scheme based on a private key of the executable smart contract not communicated to the peer processes.

11. The method of claim 1, wherein the plurality of computers is partitioned into blocks owned by different distributed ledger owners, and wherein the peer processes are distributed on the plurality of computers to maximize a number of different distributed ledger owners owning computers executing the peer processes.

12. A system for executing distributed Internet-of-Things applications, the system comprising:

one or more field devices configured to provide device data including sensor data;

one or more gateways, the one or more gateways configured to perform one or more of the following: gather or aggregate the device data from at least one of the one or more field devices or any combination thereof, compute new data based on the gathered or the aggregated device data or any combination thereof, wherein the one or more gateways are further configured to provide gateway data based on the gathered or the aggregated device data, or based on the computed new data, or on any combination thereof; and a distributed ledger system, the distributed ledger system configured to request and to receive the device data, or the gateway data, or the device data and the gateway data, wherein the distributed ledger system is further configured to process, or store, or transfer, or provide the received gateway data, or implement any combination thereof, the distributed ledger system comprising:

at least one access point configured to form an interface of the distributed ledger system for communicating with the one or more gateways and for communicating with at least one consumer via a monitoring application, the at least one access point further configured to provide input access point data to the distributed ledger system based on the gateway data, or based on consumer requests via the monitoring application, or any combination thereof; and a plurality of computers, each computer of the plurality of computers configured to execute at least one peer process configured to process input access point data and to provide peer processed data;

wherein the at least one access point is further configured to provide output access point data from the distributed ledger system based on the peer processed data and to output the output access point data to the consumer via the monitoring application; and wherein the one or more field devices, the one or more gateways, the at least one access point of the distributed ledger system and the plurality of computers of the distributed ledger system executing the peer processes are programmable with a smart contract encoding an application for the system, the smart contract encoding a distributed Internet-of-Things application defining how data should be processed, or stored, or accessed in and between the one or more field devices, the one or more gateways and the distributed ledger system, or how any combination thereof should be implemented;

wherein the device data, or the gateway data, or the input access point data, or the peer processed data, or the output access point data, or any combination thereof is signed and encrypted; or wherein the system is configured to store, or access, or transfer data in the distributed ledger system in a signed and encrypted form, or to implement any combination thereof; and wherein the encrypted data is based at least in part on a threshold cryptosystem sharing a private key among the peer processes within the distributed ledger system; and wherein encrypting, or signing, or encrypting and signing the exchanged data is based at least in part on a threshold cryptosystem configured to disseminate private key shares, relative to the executable smart contract, among the peer processes within the distributed ledger system.

13. The system of claim 12, wherein the monitoring application is configured to handle one or more smart contracts and to allow a consumer to request or build the distributed Internet-of-Things application based on a machine-readable language configured to encode Internet-of-Things applications or any combination thereof, the distributed Internet-of-Things application encoded in the machine-readable language as a code, the code forming an executable smart contract configured to program the one or more field devices, the one or more gateways, the at least one access point and the plurality of computers.

14. The method of claim 1, wherein the one or more field devices are configured to provide device data based on the executable smart contract, the device data including sensor data, wherein the one or more gateways are configured to perform one or more of the following based on the executable smart contract: gather the device data, aggregate the device data, and/or compute new data, wherein the one or more gateways are configured to provide gateway data based on the executable smart contract and further based on the gathered or the aggregated device data, or based on the computed new data, or any combination thereof, wherein the distributed ledger system is configured to request and to receive the device data, or the gateway data, or any combination thereof based on the executable smart contract, and wherein the distributed ledger system is configured to process, or store, or transfer, or provide the received gateway data, or implement any combination thereof based on the executable smart contract.

15. A method for executing an Internet-of-Things application, the method comprising:

providing a machine-readable language configured to encode the Internet-of-Things application as an executable smart contract;

receiving a code encoding the Internet-of-Things application in the machine-readable language, the code forming the executable smart contract of the Internet-of-Things application;

accessing a distributed system configured to execute the executable smart contract, the distributed system comprising one or more field devices, one or more gateways, and a distributed ledger system, the distributed ledger system comprising at least one access point and a plurality of computers, each computer of the plurality of computers configured to execute at least one peer process; and executing the executable smart contract on the distributed system, wherein the executable smart contract includes instructions that cause the distributed system to process and exchange data, the exchanged data exchanged between the one or more field devices, the one or more gateways, the at least one access point, and the at least one peer process, wherein the exchanged data is encrypted, signed, or encrypted and signed based at least in part on a threshold cryptosystem configured to disseminate private key shares, relative to the executable smart contract, among the peer processes within the distributed system, wherein the one or more field devices are configured to provide device data based on the executable smart contract, wherein the one or more gateways are configured to perform the following based on the executable smart contract: gather the device data, aggregate the device data, and compute new data, wherein the one or more gateways are configured to provide gateway data based on the executable smart contract and further based on the gathered or the aggregated device data, and the computed new data, wherein the distributed ledger system is configured to request and to receive the device data and the gateway data based on the executable smart contract, and wherein the distributed ledger system is configured to process, store, transfer, and provide the received gateway data based on the executable smart contract.

16. The method of claim 15, wherein:

the at least one access point is configured to form an interface of the distributed ledger system for communicating with the one or more gateways and for communicating with at least one consumer via a monitoring application, and wherein the at least one access point is further configured to provide input access point data to the distributed ledger system based on the gateway data, or based on consumer requests via the monitoring application, or any combination thereof and based on the executable smart contract, the at least one peer process is configured to process input access point data and to provide peer processed data based on the executable smart contract, and the at least one access point is further configured to provide output access point data from the distributed ledger system based on the peer processed data and to output the output access point data to the consumer via the monitoring application based on the executable smart contract.

17. The method of claim 16, wherein:

the exchanged data is the device data, the gateway data, the input access point data, the peer processed data, and the output access point data, and the exchanged data is exchanged based on the executable smart contract during the execution of the executable smart contract, and encrypting the exchanged data further comprises encrypting the device data, encrypting the gateway data, encrypting the peer processed data, and encrypting the output access point data.

* * * * *